March 5, 1968
O. D. COX
3,371,444
FISHING LURE
Filed May 5, 1965
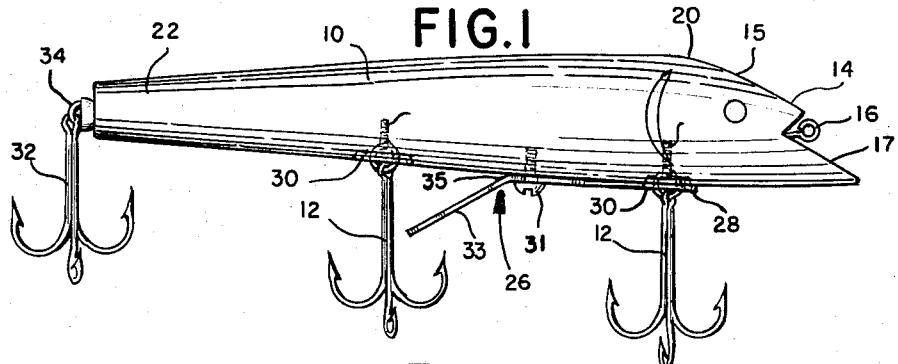
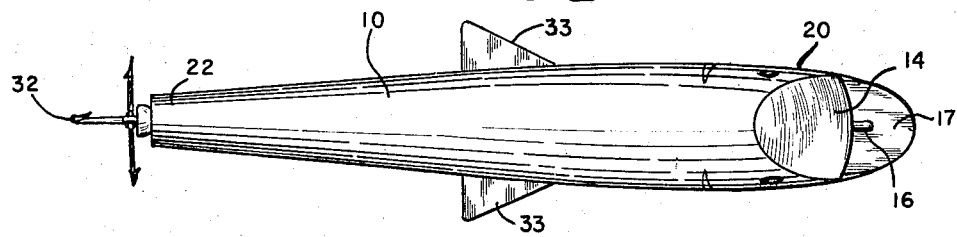
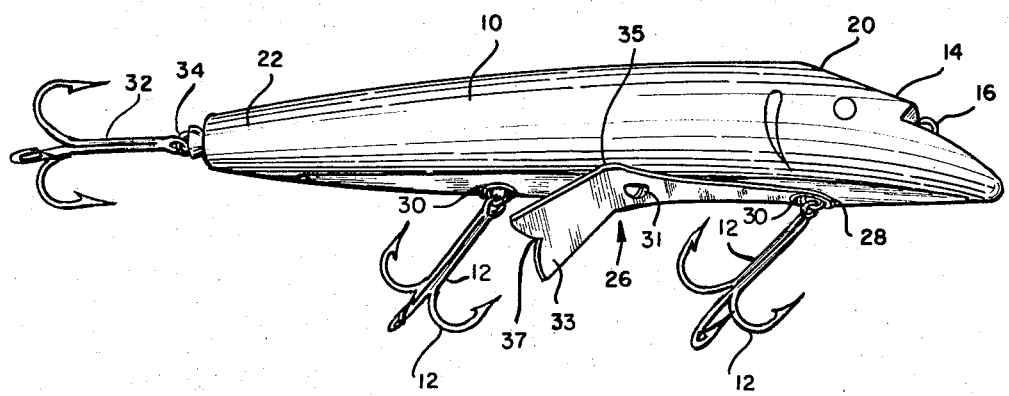
*INVENTOR.*
Oran D. Cox
By Ronald E. Barry
Attorney

United States Patent Office 3,371,444
Patented Mar. 5, 1968

3,371,444
FISHING LURE
Oran D. Cox, 706 E. Dennison St.,
Appleton, Wis. 54911
Filed May 5, 1965, Ser. No. 453,338
1 Claim. (Cl. 43—42.22)

ABSTRACT OF THE DISCLOSURE

A fishing lure comprising an elongate body member having at its front end a plane surface sloping upwardly and rearwardly to produce a descending effect on the lure as it is moved through the water, and a flat triangular plate secured to the bottom of the lure with an unattached diverging base portion bent downwardly and rearwardly at an angle to produce an ascending effect on the lure to counteract the effect of the said plane surface and being capable of adjustment to various angular positions to control the depth of the lure in the water.

---

The present invention relates to artificial fishing bait such as lures or plugs and more specifically to a new and improved depth and action control for such plugs.

Most plugs have a configuration similar to a fish and taper from the top of the head to the tip of the tail. The design of the plugs of the type contemplated herein is generally similar to the shape of a fish and supports a number of barbed fish hooks and scoops or fins which are used to cause the body to wiggle as it is drawn through the water. The plug body is generally made of a buoyant material and will float on the surface of the water. Efforts to cause the plug to move through the water at various depths have been unsatisfactory because the depth is usually dependent on the speed of the plug as it is pulled through the water.

The primary object of the present invention is to provide a means for controlling the depth at which a fishing plug will move in the water as it is drawn therethrough. This means is so designed that the depth can be adjusted if it is felt that the lure is moving through the water at a too little or too great depth.

Another object of the present invention is to provide a depth control for a fishing plug which is responsive to the speed at which the plug is drawn through the water.

Still another object of the present invention is to provide a fishing lure that will move through the water at a preset depth and will produce the natural action of a bait fish.

These objects are accomplished by mounting a triangular plate on the bottom of the lure with the apex of the plate secured to the forward part of the body. The base or rearward part of the plate is bent downward at an angle to the longitudinal axis of the plug body to form a scoop which lies transverse to the direction of flow of water past the lure. The plug body has a streamline shape being wider at its head than at its tail with a substantially flat-nosed surface which angles back from the front of the lure. As the lure is drawn through the water the backward slope of the nose will act as a scoop causing the plug to descend to a greater depth in the water the faster the plug is drawn through the water. The scoop formed by the plate on the bottom of the plug will counteract the action of the nose of the plug and no matter at what speed the lure is drawn through the water, it will level off at a preset depth. This depth can be varied by varying the angle at which the base of the plate intersects the axis of the lure.

Other objects and advantages will become more readily apparent from the following detailed description when read in conjunction with the accompanying drawings in which:

FIG. 1 is a side view of the lure.
FIG. 2 is a top view of the lure.
FIG. 3 is an orthographic projection of the lure in motion.

Referring more particularly to the drawings, the plug shown has a body 10 having a number of barbed hooks 12 secured at spaced intervals to recessed type insert washers 30 on the bottom of the body and a barbed hook 32 secured to an eye screw 34 at the rear of the body. The body is generally circular in cross section and has a flat tapered nose section 14 that is divided into an upper sloped surface 15 and a lower sloped surface 17 with a hook eye 16 secured in the gap between the surfaces for attachment to a leader. The body tapers back from the head 20 to the tail 22 in a stream-lined fashion for smooth movement through the water. The body is made of a buoyant material such as wood or can be molded from plastic so that it will normally float on the water. The angle of the shaped surfaces in the nose section of the lure will normally have a tendency to cause the plug to move at a greater depth in the water the faster it is pulled through the water.

A triangular plate 26 is secured to the bottom of the lure with its apex 28 rigidly affixed thereto. A screw 31 is used to secure the central portion of the plate to the lower portion of the body. The base or rear section 33 of the plate is notched at 37 with the base corners 39 projecting outward from the sides of the body of the plug. A flat surface is thereby produced which causes an upward force on the bottom of the plug as it is pulled through the water.

The base section is bent downward at 35 at an angle to the bottom of the body to resist the flow of water as the plug is moved through the water providing an upward force to counteract the downward force of the nose. The faster the plug is drawn through the water the greater this tendency will be. This upward tendency is used to offset the downward tendency caused by the sloped surface of the nose and in effect counteracts it. It should be apparent that by changing the angle between the back section of the plate and the plug body the tendency of the plug to ascend in the water can be changed. This angle can be adjusted by bending the plate at 35. The plate will act to some extent as a scoop, resisting the flow of water and producing a wiggle as the lure is drawn through the water.

When the plug is cast into the water it will float on the surface of the water until some forward motion is imparted to it. As it starts to move, the slope of the nose will cause the plug to go down in the water. This downward tendency of the plug is offset by the action of the scoop on the bottom of the plug. The angle of the scoop is set so that the upward tendency caused by the plate will affect the motion of the plug until it reaches the desired depth and will continue to affect the forward motion of the plug. At that depth the effect of the scoop and the slope of the nose will counteract each other no matter how fast the plug moves through the water. If the plug is not moving through the water at the desired depth, then the angle of the plate with respect to the longitudinal axis of the plug body can be varied so that counteraction will occur at a different depth.

If the plug body is molded from lightweight plastic material a permanent type scoop can be molded integral with the body. In making plugs of this type the angle of the scoop will have to be predetermined. It is also possible to provide a number of plugs having scoops molded at different angles to satisfy the requirements of different customers.

Although only one embodiment of the present invention has been shown and described it should be understood that various modifications and changes can be made herein without departing from the scope of the appended claim.

What is claimed is:

1. A fishing lure comprising:

a plug having a generally circular elongate body tapering from a wide end to a narrow end, said wide end being cut to form a plane surface transverse to the longitudinal axis of the body and sloping upwardly and rearwardly at an angle from the lower front end of the body, the slope of said plane producing a descending effect on the plug as it is moved through the water, a number of barbed hooks secured to said plug, a flat triangular plate having only its apex portion secured to the bottom of said body and with the unattached diverging base portion of the plate bent downwardly and rearwardly at an angle, the angle of said plate producing an ascending effect on said plug as it is moved through the water, and means for adjusting the angle of the plate, the counteracting effect of the plate producing a balanced effect with the said plane surface to thereby establish a predetermined depth of motion for said plug.

References Cited

UNITED STATES PATENTS

| 1,086,256 | 2/1914 | Wilber et al. | 43—42.48 |
| 1,220,921 | 3/1917 | Wilson | 43—42.22 |
| 2,743,545 | 5/1956 | Seneker | 43—42.48 |
| 2,944,363 | 7/1960 | Poe | 43—42.22 |
| 1,423,025 | 7/1922 | Rodgers et al. | 43—42.47 X |
| 1,590,529 | 6/1926 | Larzelere et al. | 43—42.47 |
| 1,801,951 | 4/1931 | Buchanan | 43—42.47 X |
| 2,277,453 | 3/1942 | Phillips | 43—42.22 |
| 2,580,733 | 1/1952 | Cowden | 43—42.22 |
| 2,703,946 | 3/1955 | Davis | 43—42.22 |

SAMUEL KOREN, *Primary Examiner.*

D. J. LEACH, *Assistant Examiner.*